(12) United States Patent
Anand et al.

(10) Patent No.: US 8,752,391 B2
(45) Date of Patent: Jun. 17, 2014

(54) INTEGRATED TURBOMACHINE OXYGEN PLANT

(75) Inventors: Ashok Kumar Anand, Niskayuna, NY (US); Richard Anthony DePuy, Burnt Hills, NY (US); Veerappan Muthaiah, Karnataka (IN)

(73) Assignee: General Electric Company, Schenectady, NY (US)

( * ) Notice: Subject to any disclaimer, the term of this patent is extended or adjusted under 35 U.S.C. 154(b) by 889 days.

(21) Appl. No.: 12/941,553

(22) Filed: Nov. 8, 2010

(65) Prior Publication Data

US 2012/0111021 A1    May 10, 2012

(51) Int. Cl.
*F02C 6/00* (2006.01)

(52) U.S. Cl.
USPC .............. 60/782; 60/780; 60/783; 60/785; 60/39.17; 60/39.23; 60/806

(58) Field of Classification Search
USPC ............. 60/782, 783, 785, 806, 39.17, 39.23, 60/780, 781
See application file for complete search history.

(56) References Cited

U.S. PATENT DOCUMENTS

| | | | |
|---|---|---|---|
| 4,545,787 A * | 10/1985 | Hegarty | 60/783 |
| 4,707,994 A | 11/1987 | Shenoy et al. | |
| 4,936,869 A | 6/1990 | Minderman et al. | |
| 5,386,686 A * | 2/1995 | Chretien et al. | 60/783 |
| 5,406,786 A * | 4/1995 | Scharpf et al. | 60/775 |
| 5,657,624 A | 8/1997 | Kang et al. | |
| 5,724,805 A | 3/1998 | Golomb et al. | |
| 5,740,673 A | 4/1998 | Smith et al. | |
| 5,901,547 A * | 5/1999 | Smith et al. | 60/773 |
| 5,964,085 A | 10/1999 | Newby | |
| 6,148,602 A | 11/2000 | Demetri | |
| 6,170,264 B1 | 1/2001 | Viteri et al. | |
| 6,202,442 B1 | 3/2001 | Brugerolle | |
| 6,247,316 B1 | 6/2001 | Viteri | |
| 6,276,171 B1 | 8/2001 | Brugerolle | |
| 6,382,958 B1 | 5/2002 | Bool, III et al. | |
| 6,523,349 B2 | 2/2003 | Viteri | |
| 6,632,846 B2 | 10/2003 | Sheppard et al. | |
| 6,871,502 B2 | 3/2005 | Marin et al. | |
| 6,898,936 B1 | 5/2005 | Ochs et al. | |

(Continued)

FOREIGN PATENT DOCUMENTS

| | | |
|---|---|---|
| CA | 2304046 | 4/1999 |
| CA | 2265312 | 12/1999 |

(Continued)

*Primary Examiner* — Phutthiwat Wongwian
*Assistant Examiner* — Steven Sutherland
(74) *Attorney, Agent, or Firm* — Cantor Colburn LLP

(57) ABSTRACT

An integrated turbomachine oxygen plant includes a turbomachine and an air separation unit. One or more compressor pathways flow compressed air from a compressor through one or more of a combustor and a turbine expander to cool the combustor and/or the turbine expander. An air separation unit is operably connected to the one or more compressor pathways and is configured to separate the compressed air into oxygen and oxygen-depleted air. A method of air separation in an integrated turbomachine oxygen plant includes compressing a flow of air in a compressor of a turbomachine. The compressed flow of air is flowed through one or more of a combustor and a turbine expander of the turbomachine to cool the combustor and/or the turbine expander. The compressed flow of air is directed to an air separation unit and is separated into oxygen and oxygen-depleted air.

18 Claims, 1 Drawing Sheet

(56) References Cited

U.S. PATENT DOCUMENTS

| | | |
|---|---|---|
| 7,284,362 B2 | 10/2007 | Marin et al. |
| 2002/0002827 A1 | 1/2002 | Viteri |
| 2002/0144506 A1 | 10/2002 | Viteri et al. |
| 2003/0233830 A1 | 12/2003 | Marin et al. |
| 2004/0016237 A1 | 1/2004 | Marin et al. |
| 2004/0128975 A1 | 7/2004 | Viteri |
| 2007/0181854 A1 | 8/2007 | Briesch et al. |
| 2007/0234729 A1* | 10/2007 | West et al. ............ 60/772 |
| 2008/0034758 A1 | 2/2008 | Marin et al. |
| 2008/0115478 A1 | 5/2008 | Sullivan |
| 2008/0202123 A1 | 8/2008 | Sullivan et al. |
| 2009/0223201 A1* | 9/2009 | Anand et al. ........ 60/39.461 |

FOREIGN PATENT DOCUMENTS

| | | |
|---|---|---|
| CN | 1215143 A | 4/1999 |
| CN | 1630769 A | 6/2005 |
| CN | 1633545 A | 6/2005 |
| CN | 21152197 Y | 11/2008 |
| DE | 19946010760 T2 | 9/1998 |
| EP | 658366 A2 | 6/1995 |
| EP | 773416 A2 | 5/1997 |
| EP | 778077 A2 | 6/1997 |
| EP | 0964050 A2 | 12/1999 |
| EP | 1043557 B1 | 9/2005 |
| EP | 1040252 B1 | 1/2008 |
| GB | 2266343 A | 10/1993 |
| GB | 2266344 A | 10/1993 |
| GB | 2335953 A | 10/1999 |
| JP | 5086897 A | 4/1993 |
| JP | 7286505 A | 10/1995 |
| JP | 8326554 A | 12/1996 |
| JP | 10226515 A | 8/1998 |
| JP | 11200885 A | 7/1999 |
| JP | 11200886 A | 7/1999 |
| JP | 11315727 A | 11/1999 |
| MX | 9605375 A | 5/1998 |
| PL | 370247 A1 | 5/2005 |
| PL | 370441 A1 | 5/2005 |
| WO | WO9915762 A1 | 4/1999 |
| WO | WO9950545 A1 | 10/1999 |
| WO | WO0175277 A1 | 10/2001 |
| WO | WO03/069132 A1 | 8/2003 |
| WO | WO03069131 A1 | 8/2003 |
| WO | WO2004046523 A2 | 6/2004 |
| WO | WO2007094908 A2 | 8/2007 |
| WO | WO2008105982 A1 | 9/2008 |

* cited by examiner

INTEGRATED TURBOMACHINE OXYGEN PLANT

FEDERAL RESEARCH STATEMENT

This invention was conceived under United States Department of Energy contract number DE-FC26-05NT42643. The Federal Government may have certain rights to the invention.

BACKGROUND OF THE INVENTION

The subject matter disclosed herein relates generally to gasification power plants. More specifically, the subject disclosure relates to air separation plants for use in power production.

Typical gasification power plants use oxygen to convert a feedstock, for example, coal into a fuel gas for combustion in a gas turbine to produce electrical power via a generator connected thereto. In an integrated gasification power plant, the air from which the oxygen is separated is supplied from the gas turbine compressor thus improving plant efficiency and reducing cost. Air is compressed in the compressor of the gas turbine, and oxygen is produced from the compressed air by separating the oxygen from other constituents of the compressed air in an air separation unit. One type of air separation unit commonly used is a membrane-based air separation unit. In a membrane-based separation unit, air separation occurs at temperatures above about 1400 F., typically in the range of about 1400 F. to about 1600 F. Compressed air from the gas turbine compressor, however, is available in the range of about 600 F. to about 1000 F. Thus, the compressed air is heated via a heat exchanger or fuel heater to raise the temperature to the necessary 1400 F. to 1600 F. for utilization in the air separation unit. Utilization of this heat exchanger adds additional cost and requires additional fuel to operate.

BRIEF DESCRIPTION OF THE INVENTION

According to one aspect of the invention, an integrated turbomachine oxygen plant includes a combustor. A turbomachine, operably connected to the combustor, includes a compressor and a turbine expander. One or more compressor pathways flow compressed air from the compressor through one or more of the combustor and the turbine expander to cool the combustor and/or the turbine expander. An air separation unit is operably connected to the one or more compressor pathways and configured to separate the compressed air into oxygen and oxygen-depleted air.

According to another aspect of the invention, a method of air separation in an integrated turbomachine oxygen plant includes compressing a flow of air in a compressor of a turbomachine and flowing the compressed flow of air through one or more of a combustor and a turbine expander of the turbomachine to cool the combustor and/or the turbine expander. A temperature of the compressed flow of air is increased to an operating temperature of an air separation unit via the flowing through combustor and/or the turbine expander. The compressed flow of air is flowed to the air separation unit where it is separated into oxygen and oxygen-depleted air.

BRIEF DESCRIPTION OF THE DRAWINGS

The FIGURE is a schematic of an air separation system for an integrated turbomachine oxygen plant.

The detailed description explains embodiments of the invention, together with advantages and features, by way of example with reference to the drawings.

DETAILED DESCRIPTION OF THE INVENTION

Figure 1:
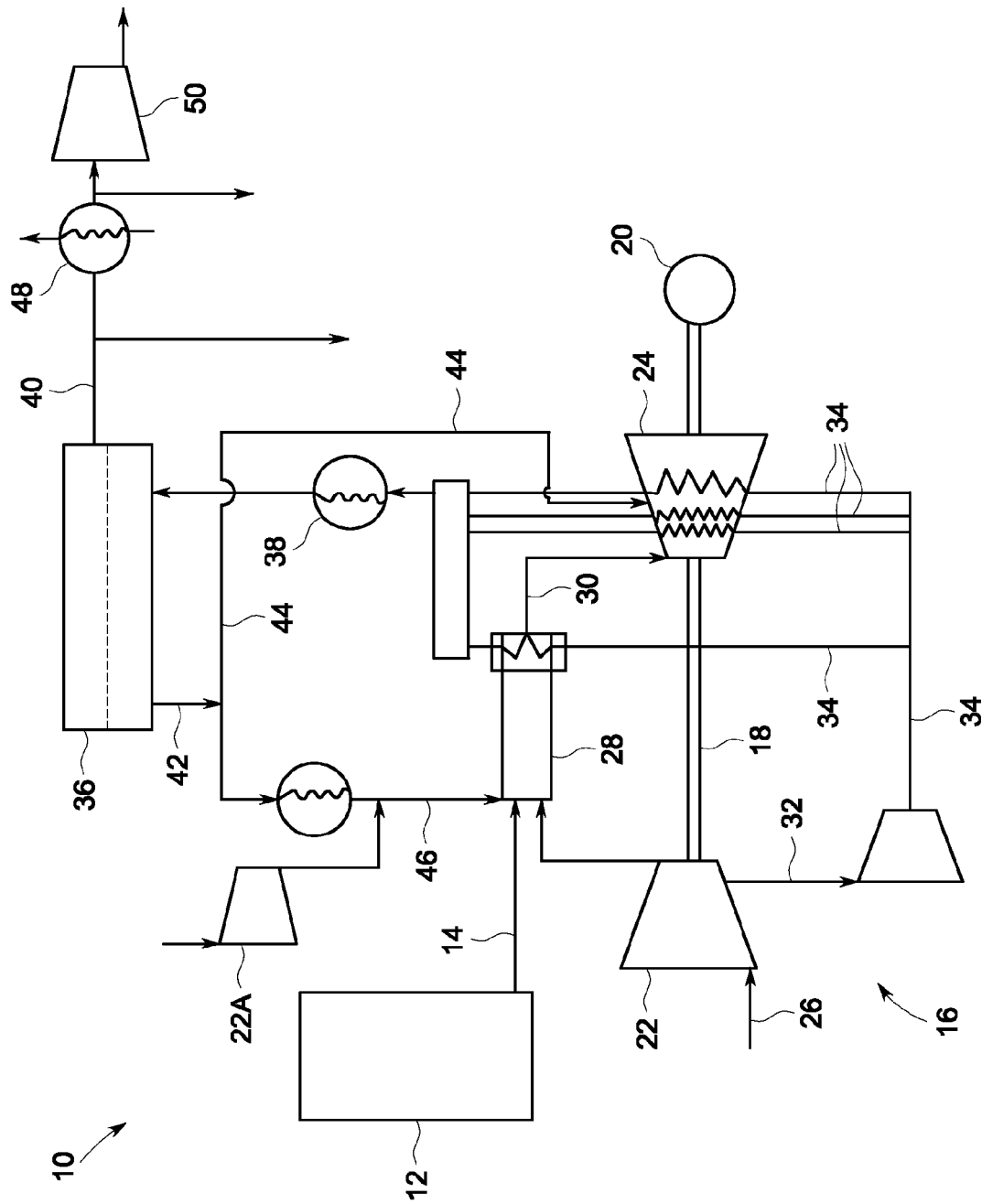

Shown in the FIGURE is a schematic of an integrated turbomachine oxygen plant 10. The plant 10 may include a gasifier 12, which produces fuel gas 14 from a feedstock such as, for example, coal. The fuel gas 14 is supplied to a combustor 28 operably connected to a turbomachine 16, for example, a gas turbine. The combustor 28 combusts the fuel gas 14 and produces combustion products 30 which drive a turbine shaft 18 of the turbomachine 16 connected to, for example, a generator 20 to produce electrical power. The turbomachine 16 includes a compressor 22 located along the shaft 18 and operably connected to a turbine expander 24. Airflow 26 is input into the compressor 22, compressed, and output to a combustor 28 to be combusted with the fuel gas 14. The combustion products 30 are routed to the turbine expander 24 to drive the shaft 18.

The plant 10 includes an air separation system which separates oxygen from other constituents in the air. A portion of a compressed airflow 32 is diverted from the compressor 22 at a compressor output temperature, typically in the range of about 600 F. to 1000 F. The compressed airflow 32 is routed to the turbine expander 24 and/or the combustor 28 via one or more compressed airflow pathways 34 to provide cooling for components therein, which typically operate at a temperature much higher than 600 F. to 1000 F., and further require such cooling for the components to achieve a useful life. The compressed airflow 32, after routing through the combustor 28 and/or the turbine expander 24, which is now at a temperature of about 1400 F. to 1600 F. in some embodiments, is routed to an air separation unit 36 which, in some embodiments, is membrane-based and has an operating temperature in the range of 1400 F. to 1600 F., a convenient match for the expander outflow. If, in some cases the expander outflow is at a temperature less than the operating temperature range of the air separation unit, additional heating of the compressed airflow 32 is required, the compressed airflow 32 may be flowed through a heat exchanger 38 or the like to increase the temperature of the compressed airflow 32 to within the operating temperature of the air separation unit 36. Utilizing heat from components of the combustor 28 and/or the turbine expander 24 to raise a temperature of the compressed airflow 32 to the desired level reduces or eliminates the need for additional heat exchangers and/or heaters such as are used in prior art systems.

Once the compressed air 32 is flowed to the air separation unit 36, the air separation unit 36 separates the compressed airflow 34 into a flow of low pressure high temperature oxygen 40 and a flow of oxygen-depleted air 42. In some embodiments, the oxygen-depleted air 42 may be flowed to the turbine expander 24 via one or more oxygen-depleted air pathways 44 to drive rotation of the shaft 18, thus increasing efficiency of the turbomachine 16. Further, in some embodiments, at least a portion of the oxygen-depleted air 42 is routed from the air separation unit 36 to the combustor 28 and introduced thereto via one or more combustor pathways 46. Introduction of the oxygen-depleted air 42 into the combustor 28 to be combusted with the fuel gas 14 increases the efficiency and output of the plant 10 and reduces emissions of, for example, $NO_x$ from the combustor 28. In some embodiments, prior to introduction into the combustor 28, the oxygen-depleted air 42 is cooled to a desired combustor 28 inlet temperature. In some embodiments, an auxiliary compressor 22A is connected to the one or more combustor pathways 46. The auxiliary compressor 22A is utilized to boost the flow through the one or more combustor pathways 46 by introducing additional high-pressure air into the stream of oxygen-depleted air 42 flowing to the combustor 28 to further increase the efficiency and power output of the plant 10.

The flow of high temperature oxygen 40 may be utilized in many different ways. For example, in some embodiments, the high temperature oxygen 40 may be introduced into the gasifier 12 in addition to the feed stock to produce the fuel gas 14. Depending on the input requirements of the gasifier 12, the flow of high temperature oxygen 40 may be modified. For example, the flow of high temperature oxygen 40 may be cooled in a heat exchanger 48 to lower the temperature of the oxygen 40. Further, if a higher pressure flow of oxygen 40 is desired, the flow of oxygen 40 is introduced to an oxygen compressor 50 to raise the pressure to a desired level. Other examples of this plant 10 may use conventional gas turbine fuels such as natural gas or oil and the Oxygen produced could be exported for use in an industrial plant.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An integrated turbomachine oxygen plant comprising:
    a combustor
    a turbomachine operably connected to the combustor including:
        a compressor; and
        a turbine expander;
    one or more compressor pathways to flow compressed air from the compressor through the turbine expander to cool the turbine expander; and
    an air separation unit operably connected to the one or more compressor pathways and configured to separate the compressed air output from the turbine expander into oxygen and oxygen-depleted air.

2. The plant of claim 1, further comprising one or more heat exchangers disposed along the one or more compressor pathways to further increase the temperature of the compressed air.

3. The plant of claim 1, further comprising one or more oxygen-depleted air pathways to flow oxygen-depleted air from the air separation unit to the turbine expander to drive rotation of the turbine expander.

4. The plant of claim 1, further comprising one or more combustor pathways to flow oxygen-depleted air from the air separation unit to the combustor for combustion with fuel gas therein.

5. The plant of claim 4, further comprising a heat exchanger disposed along the one or more combustor pathways to reduce a temperature of the oxygen-depleted air flowing therethrough.

6. The plant of claim 4, further comprising an auxiliary compressor connected to the one or more combustor pathways to boost a flow through one or more combustor pathways.

7. The plant of claim 1, where the air separation unit is configured to operate at a temperature in the range of about 1400 degrees Fahrenheit to about 1600 degrees Fahrenheit.

8. The plant of claim 1, wherein the compressed air is output from the compressor at a temperature in the range of about 600 degrees Fahrenheit to about 1000 degrees Fahrenheit.

9. The plant of claim 8, wherein the temperature of the compressed air is increased to a range of about 1400 degrees Fahrenheit to about 1600 degrees Fahrenheit.

10. The plant of claim 1, further comprising a gasifier operably connected to the combustor, wherein a fuel gas generated by the gasifier is provided to the combustor.

11. The plant of claim 1, wherein the turbine expander is operably connected to an electrical power generator.

12. A method of air separation in an integrated turbomachine oxygen plant comprising:
    compressing a flow of air in a compressor of a turbomachine;
    flowing the compressed flow of air through a turbine expander of the turbomachine to cool the turbine expander;
    increasing a temperature of the compressed flow of air to an operating temperature of an air separation unit via the flowing through the turbine expander;
    flowing the compressed flow of air from the turbine expander to the air separation unit; and
    separating the compressed flow of air in the air separation unit into oxygen and oxygen-depleted air.

13. The method of claim 12, further comprising flowing oxygen-depleted air from the air separation unit to the turbine expander to drive rotation of the turbine expander.

14. The method of claim 12, further comprising flowing oxygen-depleted air from the air separation unit to the combustor for combustion with fuel gas therein.

15. The method of claim 14, further comprising reducing a temperature of the oxygen-depleted air prior to flowing the oxygen-depleted air to the combustor.

16. The method of claim 12, where the air separation unit is configured to operate at a temperature in the range of about 1400 degrees Fahrenheit to about 1600 degrees Fahrenheit.

17. The method of claim 12, wherein the compressed flow of air is output from the compressor at a temperature in the range of about 600 degrees Fahrenheit to about 1000 degrees Fahrenheit.

18. The method of claim 12, wherein a temperature of the compressed flow of air is increased to a range of about 1400 degrees Fahrenheit to about 1600 degrees Fahrenheit.

* * * * *